United States Patent
Hegedus et al.

(10) Patent No.: US 12,429,128 B2
(45) Date of Patent: Sep. 30, 2025

(54) OIL DUCT PART TO BE MOUNTED IN A TRANSMISSION, AND TRANSMISSION COMPRISING AN OIL DUCT PART

(71) Applicant: Robert Bosch GmbH, Stuttgart (DE)

(72) Inventors: Csaba Hegedus, Erd (HU); Manfred Saretzki, Stuttgart (DE); Peter Zold, Biatorbagy (HU); Tobias Schlittenbauer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/714,271

(22) PCT Filed: Nov. 7, 2022

(86) PCT No.: PCT/EP2022/080923
§ 371 (c)(1),
(2) Date: May 29, 2024

(87) PCT Pub. No.: WO2023/099121
PCT Pub. Date: Jun. 8, 2023

(65) Prior Publication Data
US 2025/0020202 A1 Jan. 16, 2025

(30) Foreign Application Priority Data
Nov. 30, 2021 (DE) ..................... 10 2021 213 491.2

(51) Int. Cl.
*F16H 57/04* (2010.01)
*F16H 57/02* (2012.01)

(52) U.S. Cl.
CPC ..... *F16H 57/0423* (2013.01); *F16H 57/0409* (2013.01); *F16H 57/045* (2013.01);
(Continued)

(58) Field of Classification Search
CPC ............... F16H 57/0409; F16H 57/042; F16H 57/0421; F16H 57/0423; F16H 57/045;
(Continued)

(56) References Cited

U.S. PATENT DOCUMENTS 3,529,698 A   9/1970  Nelson
8,931,596 B2 * 1/2015  Shioiri ................ F16H 57/0423
                                                184/6.12
(Continued)

FOREIGN PATENT DOCUMENTS

CN   113932003 A  *  1/2022
CN   117704040 A  *  3/2024
(Continued)

OTHER PUBLICATIONS

Translation of International Search Report for Application No. PCT/EP2022/080923 dated Jan. 19, 2023 (2 pages).
(Continued)

*Primary Examiner* — Adam D Rogers
(74) *Attorney, Agent, or Firm* — Michael Best & Friedrich LLP

(57) ABSTRACT

An oil duct part to be mounted in a transmission, particularly a motor vehicle transmission, includes a conduit with an inlet port and an outlet port, at least one oil collection region for collecting oil conducted through the conduit, and at least one drain for oil from the at least one oil collection region. The conduit has an oil conducting direction (F) from the inlet port to the outlet port and a conduit wall that is closed all around perpendicularly to the oil conducting direction (F). The at least one oil collection region may have a first reservoir with a first reservoir wall and a first reservoir base, as well as a second reservoir with a second reservoir wall and a second reservoir base.

15 Claims, 3 Drawing Sheets

(52) U.S. Cl.
CPC ............... *F16H 57/0457* (2013.01); *F16H 2057/02043* (2013.01); *F16H 57/0471* (2013.01); *F16H 57/0495* (2013.01)

(58) Field of Classification Search
CPC ............ F16H 57/0457; F16H 57/0471; F16H 57/0495; F16H 2057/02043
See application file for complete search history.

(56) References Cited

U.S. PATENT DOCUMENTS

| | | | |
|---|---|---|---|
| 9,074,679 | B2 | 7/2015 | Araki |
| 9,103,432 | B2 * | 8/2015 | Isomura .............. F16H 57/0427 |
| 9,528,593 | B2 | 12/2016 | Tage et al. |
| 9,581,236 | B2 | 2/2017 | Tage et al. |
| 10,746,282 | B2 | 8/2020 | Ito et al. |
| 10,859,152 | B2 * | 12/2020 | Yu ....................... F16H 57/0475 |
| 11,486,486 | B2 | 11/2022 | Trinh et al. |
| 12,055,210 | B2 * | 8/2024 | Hirata ................. F16H 57/0483 |
| 12,331,827 | B2 * | 6/2025 | Krause ................ F16H 57/0457 |
| 2004/0154846 | A1 | 8/2004 | Kira |
| 2011/0214947 | A1 * | 9/2011 | Tuomas .............. F16H 57/0423 184/6.12 |
| 2011/0319215 | A1 | 12/2011 | Katoh et al. |
| 2013/0283955 | A1 | 10/2013 | Araki et al. |
| 2019/0186622 | A1 | 6/2019 | Ishikawa et al. |
| 2024/0110622 | A1 * | 4/2024 | Krause ................ F16H 57/0493 |
| 2024/0318717 | A1 | 9/2024 | Cheron et al. |
| 2025/0020201 | A1 * | 1/2025 | Henn ................... F16H 57/045 |
| 2025/0020204 | A1 * | 1/2025 | Henn ................... F16H 57/045 |

FOREIGN PATENT DOCUMENTS

| | | | | |
|---|---|---|---|---|
| DE | 1291966 | B | | 4/1969 |
| DE | 102007021686 | A1 | | 11/2008 |
| DE | 102017108748 | B3 | | 8/2018 |
| DE | 102019006118 | A1 * | 3/2020 | ......... F16H 57/0409 |
| DE | 102020204587 | A1 | | 11/2020 |
| DE | 102012215355 | B4 | | 9/2021 |
| DE | 102021211977 | A1 * | 4/2023 | ......... F16H 57/0423 |
| DE | 202023002785 | U1 | | 8/2024 |
| DE | 102024107189 | A1 | | 9/2024 |
| EP | 2700849 | A1 | | 2/2014 |
| EP | 3018386 | A1 | | 5/2016 |
| EP | 3026300 | A1 | | 6/2016 |
| FR | 3091736 | A1 | | 7/2020 |
| GB | 1115446 | A * | 5/1968 | |
| JP | 2002054729 | A | | 2/2002 |
| JP | 2004092894 | A * | 3/2004 | ......... F16H 57/0421 |
| JP | 2005083491 | A | | 3/2005 |
| JP | 2010202190 | A | | 9/2010 |
| JP | 4573410 | B2 | | 11/2010 |
| JP | 2015086926 | A * | 5/2015 | ......... F16H 57/0423 |
| JP | 2017227321 | A | | 12/2017 |
| JP | 2020034127 | A | | 3/2020 |
| JP | 2020112245 | A | | 7/2020 |
| JP | 2021021466 | A | | 2/2021 |
| JP | 2021038823 | A | | 3/2021 |
| KR | 20220168021 | A * | 12/2022 | |
| WO | 2024183846 | A1 | | 9/2024 |

OTHER PUBLICATIONS

Non-final Office Action issued by the U.S. Patent Office for U.S. Appl. No. 18/714,614, dated Mar. 18, 2025 (16 pages).
Non-final Office Action issued by the U.S. Patent Office for U.S. Appl. No. 18/714,239, dated May 19, 2025 (15 pages).

* cited by examiner

OIL DUCT PART TO BE MOUNTED IN A TRANSMISSION, AND TRANSMISSION COMPRISING AN OIL DUCT PART

BACKGROUND

In the prior art, transmissions for motor vehicles are in particular also used in combination with an electromotive drive. As with conventional transmissions, the transmission elements of the transmission must also be lubricated with oil. In order to increase transmission efficiency and reduce costs, an oil pump often used in conventional transmissions for transmission lubrication can be omitted. Lubrication and cooling of the transmission elements is preferably achieved by passive oil distribution. Lubrication of the rotating transmission elements is important for transmission reliability. Insufficient lubrication may cause a lack of supply of oil to the bearings of the transmission elements and the sealing rings. This may lead to increased wear and even failure of the transmission elements.

An oil duct part to be mounted in a motor vehicle transmission is known from DE 10 2017 108 748 B3. The illustrated transmission includes a transmission housing and at least one transmission gear located in the transmission housing and located at least partially in an oil sump of the transmission. One section of the rotating transmission gear rolls through the oil sump and receives oil in the process. A process that is also often described in technical terms as splashing. In order to distribute oil received by the transmission gear more precisely in the transmission, a goggle-like oil duct part is used in prior art, which can be inserted into the transmission as an insert part. The oil duct part comprises a plurality of orifices and a conduit having an inlet port and an outlet port, wherein the conduit has an oil conducting direction from the inlet port to the outlet port and a conduit wall that is closed all around perpendicularly to the oil conducting direction. In DE 10 2017 108 748 B3, the conduit wall is formed by a half-arc hollow body curved about a gear axis of a transmission gear, which is in a predetermined mounting state of the oil duct part predominantly above an oil sump level of the transmission. The curved conduit has an inlet port formed as a catch jaw for receiving oil which is thrown up by another transmission gear meshing with the transmission gear surrounded by the half-arc hollow body and transported further from the second transmission gear to the catch jaw. An end section of the half-arc hollow body that faces away from the catcher mouth and is closed except for a throttle bore forms an oil collection region for collecting oil conveyed through the conduit. The throttle bore forms the only outlet port of the conduit and therefore simultaneously represents a drain for the oil from the at least one oil collection region. The throttle bore is located vertically above the meshing region of the two transmission gears, such that the oil flows off into the meshing region and wets the contact surfaces of the teeth.

SUMMARY

The invention relates to an oil duct part to be mounted in a transmission, in particular to be mounted in a motor vehicle transmission, wherein said oil duct part comprises a conduit with an inlet port and an outlet port, wherein the conduit has an oil conducting direction from the inlet port to the outlet port and has a conduit wall that is closed all around perpendicularly to the oil conducting direction, wherein the oil duct part further comprises at least one oil collection region for collecting oil conducted through the conduit, wherein the oil duct part also comprises at least one drain for oil from the at least one oil collection region. According to the invention, the at least one oil collection region comprises a first reservoir with a first reservoir wall and a first reservoir base as well as a second reservoir with a second reservoir wall and a second reservoir base, wherein the conduit adjoins the first reservoir wall and the second reservoir wall in such a way that when viewed in the oil conducting direction of the conduit, the first reservoir base is located between the inlet port and the outlet port, and the second reservoir base is located between the inlet port and the first reservoir base.

Furthermore, the invention relates to a transmission, in particular a motor vehicle transmission, with a transmission housing, with an oil duct part located in the transmission housing with the features described above, and with at least one transmission gear located in the transmission housing, which is at least partially located in an oil sump of the transmission, wherein the oil duct part is located in the transmission housing in a predetermined mounting state, which defines an orientation of the oil duct part in the transmission housing relative to gravity, in such a way that the inlet port is positioned on the end face of the transmission gear arranged at least partially in the oil sump, the oil conducting direction from the inlet port to has at least one component running against gravity to the outlet port and at least the first reservoir base is located above the transmission gear.

In the context of the present application, an "oil" is to be understood as a transmission-driven liquid lubricant, regardless of whether it is commercially marketed as oil. For instance, it may be a lubricant or similar substance referred to as an ATF (Automatic Transmission Fluid). Preferably these are MTFs.

A predetermined mounting state defining an orientation of the oil duct part in the transmission relative to the gravitational force is understood to mean a mounting state representing a particular orientation of the oil duct part relative to the transmission housing with a known orientation of the associated transmission relative to the earth's gravitational field. The orientation of the transmission relative to the earth's gravitational field is generally known for a normal position of the transmission, wherein the normal position is the position in which the transmission is oriented relative to the gravitational force in the intended application. If the transmission is a motor vehicle transmission, the transmission assumes a certain orientation to the gravitational force of the earth when the motor vehicle is horizontally aligned relative to the earth's gravitational field in the normal position. This applies regardless of whether the motor vehicle is actually moving horizontally to the earth's gravitational field or whether it is traveling on a slope with an inclination angle. From a previously known mounting position of the transmission in the motor vehicle, it is therefore generally possible to derive how an oil duct part is to be installed in the transmission so that the oil duct part assumes a certain orientation relative to the gravitational force in the normal position.

A component of the oil conducting direction running against gravity from the inlet port to the outlet port is understood to mean that the oil conducting direction, broken down into movement components, has at least one component or movement component directed against gravity. This does not necessarily require the entire oil conducting direction to be antiparallel to the direction of gravity. For example, the oil conducting direction can also run at an angle to gravity or parallel to gravity in the opposite direction.

An oil duct part is understood to mean a component comprising at least one conduit for oil transport. The oil duct part may be configured to distribute oil supplied to the oil duct part under the influence of the gravitational force in the oil duct part. The oil duct part may in particular be configured as an insert part, which is inserted into the transmission during assembly. The oil duct part may be made of plastic or metal or a plastic-metal composite. The oil duct part may have a one piece or multiple piece design. In particular, it is possible to assemble the oil duct part from two or more shell parts, which are mechanically connected to each other via catch connections or clip connections.

In the context of the present application, relative to an assumed reference point, the terms "below" or "underneath" denote a position at a point lower in the direction of the gravitational force and the terms "above" or "over" denote a position at a point higher in the direction of the gravitational force, wherein an orientation of the oil duct part corresponding to the predetermined mounting state is assumed.

An oil sump of the transmission is understood to mean a region within the transmission housing in which oil accumulates under the influence of the gravitational force. A transmission gear that is located at least partially in an oil sump of the transmission is understood to mean a transmission gear that is submerged in the oil sump with a lower part in the direction of the gravitational force, while an upper part of the transmission gear protrudes out of the oil sump. Upon rotation of the transmission gear, it receives oil from the oil sump and transports it to a release point or break-off point in the opposite direction of the gravitational force. This process is referred to as "splashing." The circulation and delivery rate of the oil through the transmission gear depend directly on the speed and, via the viscosity, also on the temperature. The amount of oil removed from the oil sump by a transmission gear causes the level of the oil sump to decrease during operation. The transmission gear may, therefore, be considered an oil-conveying transmission gear. Oil splashed from the transmission gear and possibly further transmission gears during rapid rotation in the transmission housing can reach locations from which there is no rapid return to the oil sump. To ensure that sufficient oil is still being conveyed from the transmission gear and the transmission does not run dry, the oil sump must have an appropriate amount of oil. On the other hand, too much oil in the oil sump is not desirable as this increases disadvantageous drag losses of the transmission. As a compromise, it is therefore desirable to supply the amount of oil removed by the transmission gear as specifically as possible to the lubrication points in the gear transmission in order to avoid splash losses and to be able to lower the level in the oil sump to a level at which drag losses of the transmission are minimized. This is achieved by the oil duct part.

The oil duct part according to the invention allows a more targeted oil supply of bearings of rotating transmission elements within a transmission housing. This is achieved by the fact that the at least one oil collection region comprises a first reservoir with a first reservoir wall and a first reservoir base as well as a second reservoir with a second reservoir wall and a second reservoir base, wherein the conduit adjoins the first reservoir wall and the second reservoir wall in such a way that when viewed in the oil conducting direction of the conduit, the first reservoir base is located between the inlet port and the outlet port, and the second reservoir base is located between the inlet port and the first reservoir base.

As the lubrication points in a transmission are located at different vertical positions, the oil must be conveyed upwards from the oil sump at the bottom of the transmission housing to the input shaft, wherein lubrication points are also located in between. Here, a two-stage collection region with a second reservoir, the second reservoir base of which is located between the inlet port and the first reservoir base, makes it easier to bring the oil to lubrication points that are located at different vertical levels relative to gravity.

In particular, the oil duct part is advantageously configured to be installed in a transmission in a predetermined mounting state defining an orientation of the oil duct par relative to the gravitational force, wherein, in an orientation that corresponds to the predetermined mounting state, the first reservoir base and the second reservoir base are oriented approximately perpendicular to the gravitational force and the oil conducting direction extends from the inlet port to the outlet port in the opposite direction to the gravitational force. The oil duct part according to the invention can in particular be installed in a transmission such that in the predetermined mounting state, the inlet port of the conduit can be positioned on the end face of a transmission gear of the transmission and the reservoir base above the transmission gear. Oil received in the conduit through the inlet port may be transported up to the outlet port against the gravitational force, wherein oil exiting the outlet port may accumulate in the first reservoir.

In contrast to the solutions known from the prior art, in which the collection region forms the end region of a half-arch hollow body curved around a gear axis, in the present invention the collection region comprises a first and second reservoir. At least the first oil reservoir can be located above the oil-conveying transmission gear. The second oil reservoir is located below the first oil reservoir and can be located in the direction of gravity, for example, at least partially below the end wall of the oil-conveying transmission gear or also completely or partially above it. The oil that accumulates in the first and the second reservoir causes the oil sump at the base of the transmission housing to lower during operation. The conduit is designed as a simple, circumferentially closed conduit that can extend from the inlet port to an outlet port, preferably in a straight line for 80% of its longitudinal extension direction. The port cross-section of the inlet port may correspond to the port cross-section of the outlet port. The conduit with the circumferential conduit wall represents a conduit integrated into the oil duct part.

In contrast to the prior art, the oil duct part is configured such that the oil does not accumulate in the conduit but outside the conduit in the first and the second reservoir. This has the advantage that sufficient lubrication of the transmission bearings is also possible in the event of speed fluctuations, as the supply contained in the first and the second reservoir can initially be used to supply the lubrication points during operation. At least one drain, but preferably several outlets, may be present at the first and the second reservoir to realize the oil supply to different bearings in the transmission.

Advantageously, compared to the prior art, the amount of oil conveyed through the conduit during operation may be configured to be more independent of the amount of oil drained from the oil collection region via a drain. The conduit is only used to fill the first and second reservoirs, while the discharge of oil from the first reservoir and the second reservoir can be adjusted via the geometric design of the reservoirs and the geometric design of the associated drains. The oil supply to bearing points of the transmission elements can therefore be advantageously optimized both locally and with regard to time. In particular in transmissions in which rotating transmission elements are located above one another in multiple planes in relation to the gravitational force, this enables improved lubrication of the bearing points.

As the first and the second reservoir may be advantageously used as an intermediate reservoir, faster lubrication is available when the electric machine driving the transmission is reactivated, even if it is deactivated for short periods. During longer downtimes, the first reservoir and/or the second reservoir can optionally drain completely towards the oil sump via a small drain port in the respective reservoir base. However, the drain ports are by no means essential.

Advantageously, an end of the conduit wall of the conduit facing away from the inlet port can form a wall projecting above the first reservoir base of the first reservoir and delimiting the outlet port. Oil draining over this wall can therefore drain directly into the first reservoir and fill it.

Advantageously, the conduit can be continuously closed from the inlet port to the outlet port and be straight along at least 80% of its length. This allows the oil supplied to the conduit to be transported towards the outlet port with as little obstruction as possible. The rectilinear conduit can be aligned in a transmission in particular in such a way that one section of it runs tangentially to one end face of a transmission gear in the predetermined mounting state. The inlet port of the conduit can be configured as a catch jaw, for example, wherein the circumferential edge of the inlet port can be beveled according to the tangential angle of the conduit, so that the inlet port can be brought as close as possible to the end face of the transmission gear. The contour of the circumferential edge can be adapted to the radius of curvature of the end face of a transmission gear. In an orientation of the oil duct part which corresponds to the predetermined mounting state, oil exiting the outlet port of the conduit drains in the direction of the gravitational force and collects in the first reservoir, which is thereby filled.

The second reservoir can be easily filled with oil draining from the first reservoir via a first dam. This initially fills the first reservoir up to the height of the first dam. As soon as this is reached, oil in or on the oil duct part runs off via the first dam in the direction of the second reservoir.

Advantageously, the first reservoir has at least one first drain and the second reservoir has at least one second drain, wherein oil from the second reservoir reaches the second drain in particular via a second dam. The at least one first drain and the at least one second drain can supply different bearings on different vertical levels in a transmission with lubricating oil. The oil supply to the bearings is advantageously "passive", i.e., by draining the oil via the respective associated drains.

Furthermore, the first reservoir can be provided with a partition wall projecting from the first reservoir base, which divides the first reservoir into at least two partial regions, wherein the outlet port opens towards a first partial region and the second partial region is connected to the first partial region via a cut-through in the partition wall. The partition wall is flushed over when the first reservoir is filled so that oil enters both partial regions. The oil is first drained from the second partial region towards the first partial region via the cut-through. In particular, the partition wall can be designed as a surge breaker and has a keel facing the outlet port, from which partial walls bent backwards in opposite directions extend towards a first drain and a third drain. Oil that emerges from the outlet port of the conduit hits the keel and is split into two partial flows, which flow in the direction of outlets facing away from each other.

The oil duct part according to the invention can be used particularly advantageously in combination with a transmission, wherein the oil duct part can be used in a transmission housing of the transmission. The transmission has at least one transmission gear located in the transmission housing, which is located at least partially in an oil sump of the transmission. In a predetermined mounting state, which defines an orientation of the oil duct part in the transmission housing relative to gravity, the oil duct part is located in the transmission housing such that the inlet port is positioned at the end face of the transmission gear located at least partially in the oil sump, the oil conducting direction from the inlet port to the outlet port has at least one component running counter to gravity and at least the first reservoir base is located above the transmission gear.

Oil thrown up from the oil sump by the transmission gear during operation advantageously reaches the inlet port and the outlet port along the oil conducting direction of the conduit.

Advantageously, the first reservoir is provided with at least one first drain and the second reservoir is provided with at least one second drain, wherein a drain port of the first drain supplies a bearing of a first transmission element, in particular the bearing of an input-side rotor shaft mounted in the transmission, with oil and an drain port of the second drain supplies a bearing of a second transmission element, in particular a bearing of a pinion, with oil. Different bearings of transmission elements of the transmission can be supplied with oil via the first drain and the second drain and, if necessary, other outlets.

BRIEF DESCRIPTION OF THE DRAWINGS

In the following, possible embodiment examples of the invention are explained with reference to the accompanying drawing. The following is shown in the drawings.

DETAILED DESCRIPTION

Figure 1:
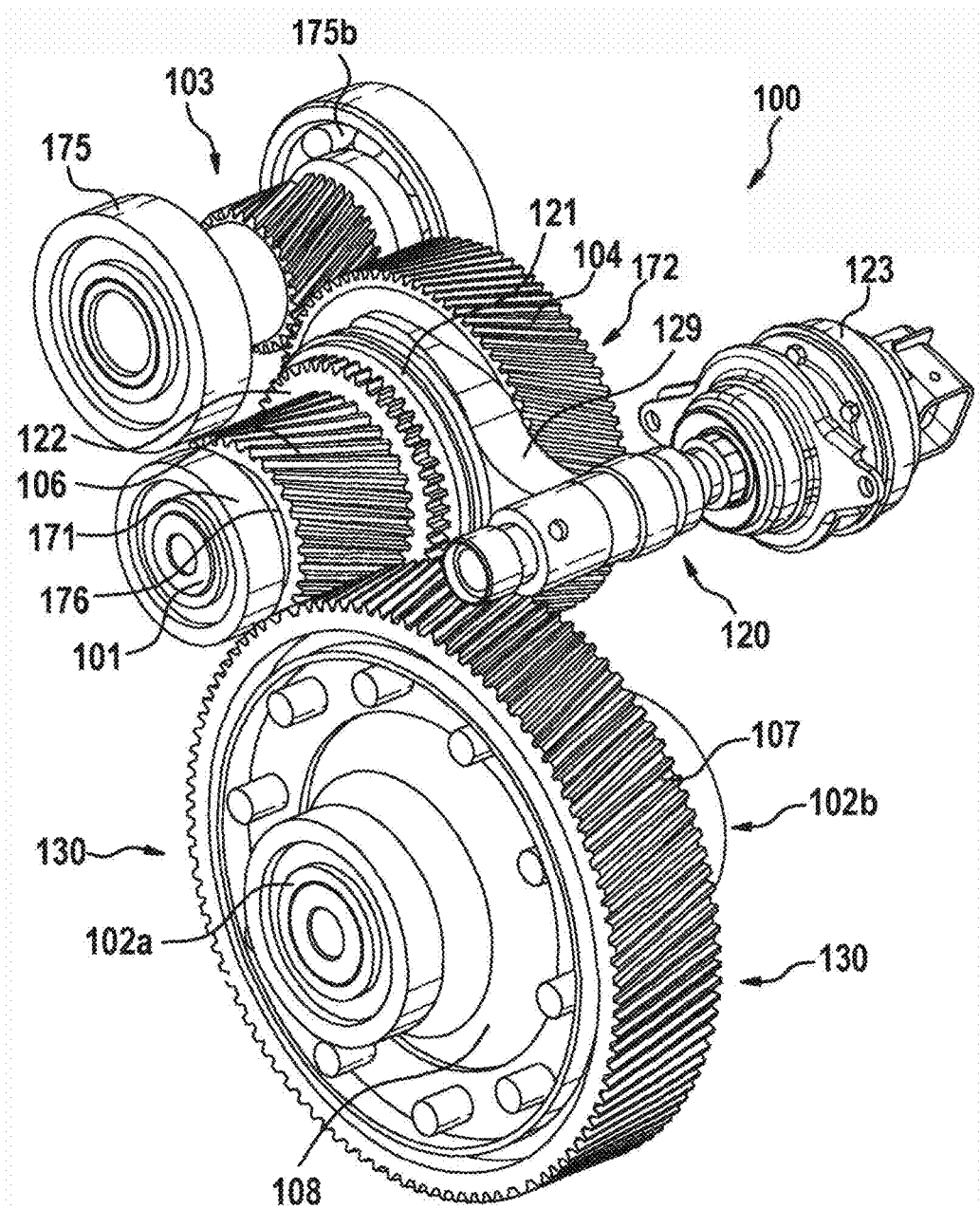
FIG. 1 a cross-section through a transmission of a motor vehicle, which is driven by an electric machine not shown, and in which the oil duct part can be inserted, FIG. 2 a perspective view of an exemplary embodiment of an oil duct part according to the invention for use in a transmission, FIG. 3 a cross-section through a transmission with transmission housing, which corresponds to the structure shown in FIG. 1, with an oil duct part inserted therein in a predetermined mounting state, as shown in FIG. 2.

FIG. 1 shows a propulsion device for a motor vehicle comprising a transmission 100. The description of the transmission serves to explain the possible uses of an oil duct part, as will be described further below.

The transmission 100 is connected on the input side to an electrical machine, not shown, which has a rotor shaft 103. The rotor shaft 103 is mounted in two bearings 175, 175*b* and meshes with a gear wheel 104, which is coupled to a drive shaft 101 or intermediate shaft of the transmission so that it cannot rotate. The drive shaft 101 is rotatably mounted about its outer circumference at two axially spaced bearing points 171 and 172 in a transmission housing (not shown in FIG. 1).

Furthermore, the transmission 100 comprises a coupling device 120, which can be controlled, for example by means of an electrically actuated rotary actuator 123. The electric actuator 123 can, for example, act on a clutch element 121 via a spindle drive and a shift fork 129, which is mounted axially displaceably on a guide hub not shown in FIG. 1. For example, the coupling element 121 is annular and may rotate relative to the shift fork 129. The coupling element 121 can have an internal toothing which engages in an external toothing of the guide hub, so that the coupling element 121 can be displaced on the guide hub parallel to the axis of the drive shaft 101. The guide hub and the coupling element 121 engaging with it are mounted on the drive shaft 101 in a non-rotatable manner. Furthermore, a coupling element 122 is provided that is coupled to a pinion 106 in a rotationally fixed manner. For example, the pinion 106 is rotatably mounted on the drive shaft 101 with a bearing 176 configured as a nail bearing. The coupling element 122 may have external toothing. When the rotary actuator 123 is actuated, the spindle drive displaces the coupling element 121 in the axial direction via the shift fork until the internal toothing of the coupling element 121 engages the external toothing of the coupling element 122, whereby the coupling element 121 is coupled to the coupling element 122 in a rotationally fixed manner. The coupling causes the gear 104, the drive shaft 101, the guide hub, the coupling element 121, the coupler element 122, and the pinion 106 to rotate as a block about the axis of the drive shaft 101. When decoupling is performed, the rotary actuator 123 is used to pull the coupling element 121 away from the coupler element 122 in FIG. 1 to the right, thereby disengaging the coupling between the pinion gear 106 and the drive shaft 101. The pinion gear 106 may now rotate about the drive shaft 101.

Figure 3:
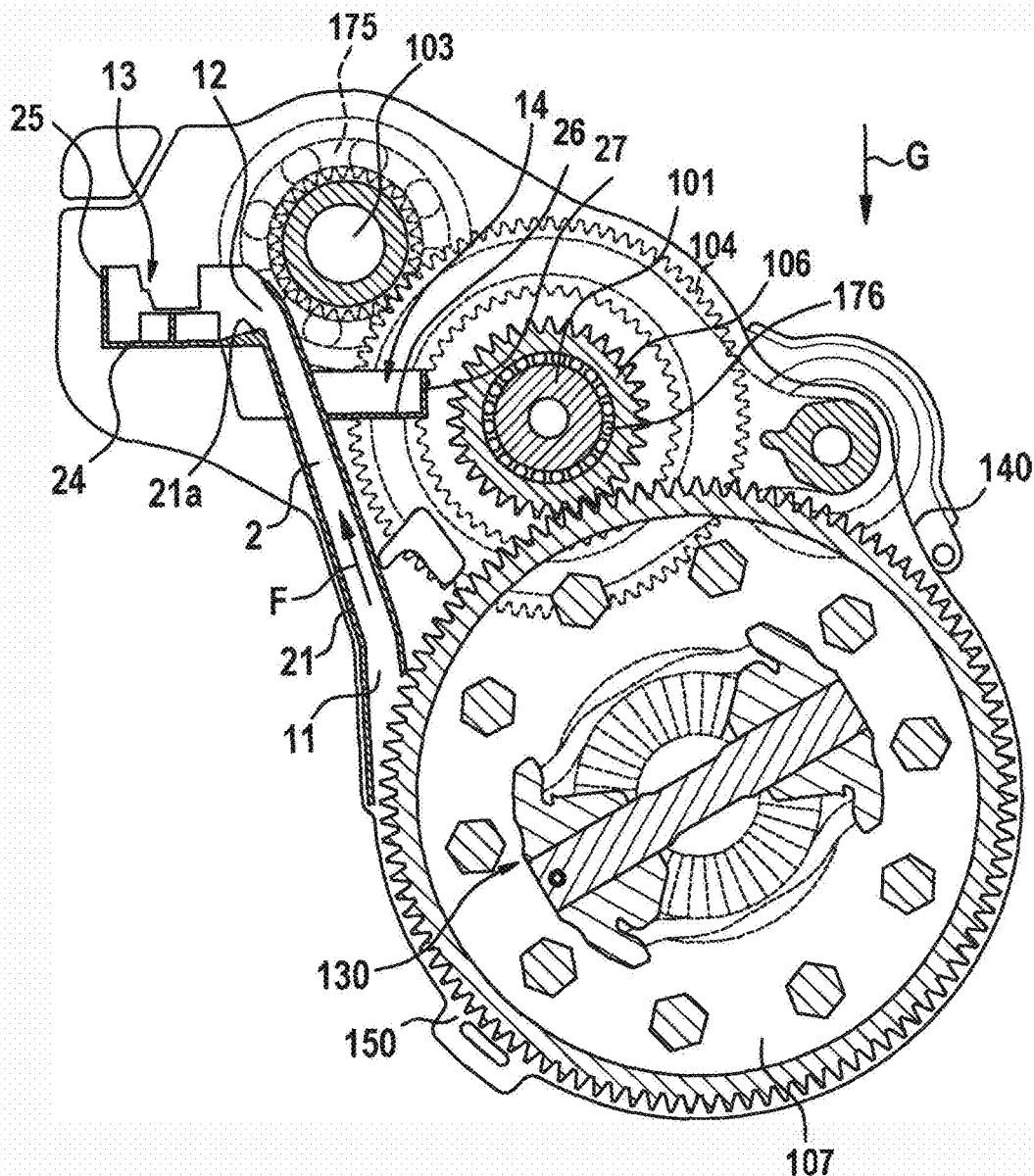

The pinion gear 106 meshes with a transmission gear 107. The transmission gear 107 is coupled to a differential 130 in a rotationally fixed manner. The differential 130 comprises an output shaft 102 in the form of a first output shaft 102*a* and a second output shaft 102*b* that may be rotationally driven with the differential 130. The transmission gear 107 is fixedly connected to the differential cage 108 of the differential 130. As shown in FIG. 3, the differential 130 may be integrated into the transmission housing 140 of the transmission 100.

As already described, the coupling between the pinion 106 and the drive shaft 101 is disengaged in the decoupled state by means of the coupling device 120. If, for example, the electric machine is additionally switched off in a driving state of a motor vehicle, the rotor shaft 103 and the drive shaft 101 are no longer driven. The wheels of the still rolling motor vehicle now drive the transmission gear 107 via the output shaft 102, which meshes with the pinion 106 so that the pinion 106 rotates about the drive shaft 101. Even in this state, it must be ensured that, for example, the bearing 176 of the pinion 106 located above the oil sump of the transmission 100 is sufficiently supplied with oil.

Figure 2:
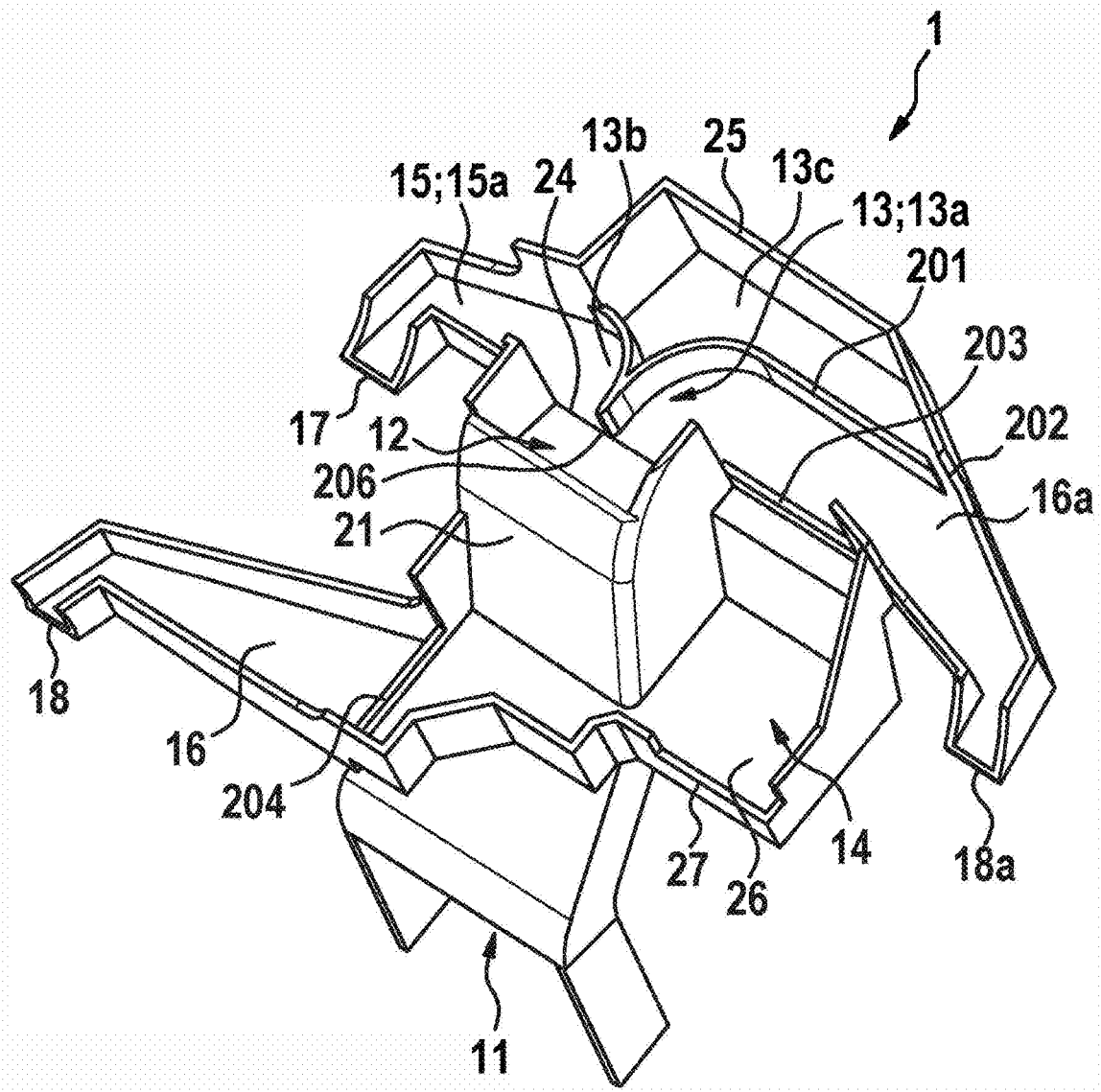

FIG. 2 shows an exemplary embodiment of an oil duct part 1 according to the invention, which can, for example, be intended to be installed in the transmission 100 shown in FIG. 1. As shown here, the oil duct part 1 may in particular be configured as an insert part, which is inserted into the transmission 100 during assembly of the transmission 100. The oil duct part 1 may be made of plastic or metal or a plastic-metal composite and have a one piece or multiple piece design. In particular, it is possible to assemble the oil duct part from two or more shell parts, which are mechanically connected to each other via catch connections or clip connections.

The oil duct part 1 has a conduit 2 (more clearly visible in FIG. 3) with an inlet port 11 and an outlet port 12, wherein the conduit 2 has an oil conducting direction F (shown in FIG. 3) from the inlet port 11 to the outlet port 12 and a conduit wall 21 that is closed all the way around perpendicular to the oil conducting direction F. The oil duct part 1 further comprises an oil collection region 13*a* for the collection of oil conveyed by the conduit 2 and a drain 15*a* for oil from the oil collection region 13*a*.

As shown in FIG. 2, the collection region 13*a* comprises a first reservoir 13 at the upper end of the oil duct part 1. The first reservoir 13 comprises a first reservoir wall 25 and a first reservoir base 24. As can best be seen in FIG. 3, one end of the conduit wall 21 facing away from the inlet port 11 of the conduit 2 forms a wall 21*a* projecting beyond the first reservoir base 24 of the first reservoir 13 and delimiting the outlet port 12.

As can also be seen in FIG. 2, the first reservoir 13 is provided with a partition wall 201 protruding from the first reservoir base 24, the height of which is less than the height of the reservoir wall 25. The partition wall 201 divides the first reservoir 13 into at least two partial regions, wherein the outlet port 12 opens towards a first partial region 13*b*. The second partial region 13*c* is connected to the first partial region 13*b* via a cut-through 202 in the partition wall 201. As can also be seen in FIG. 2, the partition wall 201 can be designed as a surge breaker with a keel 206 facing the outlet port 12. Partial walls bent backwards in opposite directions extend from the keel 206 to a first drain 15 and a third drain 16*a* of the first reservoir 13. Oil that escapes from the outlet port 12 runs off via the wall 21 into the first reservoir 13 and meets the keel 206 there. The partition wall 201 can be partially flooded, so that the oil collects in the first partial region 13*b* and the second partial region 13*a*. From there, the oil drains via the first drain 15 in the direction of the drain port 17 and via the third drain 16*a* in the direction of the drain port 18*a*. The first drain 15 and the second drain 16 can be designed as an angled channel.

As can also be seen in FIG. 2, the collection region of the oil duct part 1 comprises a second reservoir 14, wherein the second reservoir 14 has a second reservoir wall 27 and a second reservoir base 26. The second reservoir 14 is located between the inlet port 11 of the conduit and the first reservoir base 24 of the first reservoir 13. On its side facing the second reservoir 14, the reservoir wall 25 of the first reservoir 13 is interrupted by a first dam 203. The height of the first dam 203 is significantly lower than the height of the reservoir wall 25. Oil that fills the first reservoir 13 partially drains over the dam 203 in the direction of the second reservoir 14 if the filling level is sufficient. The reservoir wall 27 of the second reservoir 14 can also be interrupted at one point by a second dam 204, the height of which is less than the height of the second reservoir wall 27. Once the second reservoir 14 is sufficiently filled, the oil flows via the second dam 204 to a second drain 16, which is designed as an angled channel and has a further drain port 18.

The oil duct part 1 shown in FIG. 2 is designed to be located in the transmission housing 140 of a transmission in a predetermined mounting state, which defines an orientation of the oil duct part relative to the force of gravity G. Without being limited thereto, the oil duct part 1 is preferably intended to be inserted into the transmission 100 shown in FIG. 1. For this purpose, the oil duct part 1 can be provided with corresponding projections and retaining cams with which the oil duct part 1 can be installed and anchored in a transmission housing 140 of the transmission 100 in a predetermined orientation relative to the normal position of the transmission 100.

FIG. 3 shows a transmission 100, the basic structure of which corresponds to the transmission shown in FIG. 1, with the oil duct part 1 from FIG. 2 installed in it. It can be seen that the inlet port 11 of the conduit 2 can be positioned at the end face of the transmission gear 107 and in the immediate vicinity of the end face of the transmission gear 107, while the reservoir base 24 of the first reservoir 13 and, in this embodiment, for example also the reservoir base 26 of the second reservoir 14 can be located above the transmission gear 107. The oil conducting direction F has components running from the inlet port 11 to the outlet port 12 against the force of gravity G. The orientation of the gravity G is shown for the normal position of the transmission 100 in FIG. 3. It can be seen that the oil conducting direction F runs at an angle to gravity and has a relatively large component that is directly opposed to gravity. Viewed in the oil conducting direction F of the conduit 2, the first reservoir base 24 is arranged between the inlet port 11 and the outlet port 12 and the second reservoir base 26 is located between the inlet port 11 and the first reservoir base 24.

The conduit 2 is preferably rectilinear over 80% of its longitudinal extent and preferably runs tangentially to an end face of the transmission gear 107, at least in the region of the transmission gear 107. The inlet port 11 can be configured as a catch jaw, wherein the circumferential edge of the inlet port 11 can be beveled according to the angle formed by the direction of the gravitational force and conducting direction F, so that the inlet port 11 can be brought as close as possible to the end face of the transmission gear 107. The contour of the circumferential edge may be adapted to the radius of curvature of the end face of a transmission gear 107 as shown.

The transmission gear 107 of the transmission 100 is partially located in an oil sump 150. The transmission gear 107 receives oil from the oil sump 150 and transports it into the inlet port 11 of the conduit 2. The movement pulse of the oil pushes it in the conduit 2 in the oil conducting direction F up to the outlet port 12.

The oil draining from the oil duct part 1 via the first drain 15, the second drain 18 and the third drain 18a can be fed to different bearings of transmission elements in the transmission 100, which can be spatially distant from one another. For example, the first drain 15 can supply oil via the drain port 17 and the third drain 16a can supply oil via the drain port 18a to a first and/or second bearing of a transmission element, in particular the bearing 175 and the bearing 175b of the input-side rotor shaft 103 mounted in the transmission 100.

The drain port 18 of the second drain 16 can supply a bearing of a further transmission element, in particular the bearing 176 of the pinion 106, with oil in another plane, which is located between the inlet port 11 and the outlet port 12.

It goes without saying that the first and second reservoirs and the outlets branching off from them can be used to optimize the supply of lubricating oil to the bearings of rotating transmission elements, even for transmissions with a different design.

What is claimed is:

1. An oil duct part (1) to be mounted in a transmission (100), the oil duct part (1) comprising:
    a conduit (2) with an inlet port (11) and with an outlet port (12),
    wherein the conduit (2) has an oil conducting direction (F) from the inlet port (11) to the outlet port (12) and a conduit wall (21) which is closed circumferentially perpendicular to the oil conducting direction (F),
    at least one oil collecting region (13a) for collecting oil conducted through the conduit (2), and
    at least one drain (15a) for oil from the at least one oil collecting region (13a),
        wherein the at least one oil collecting region (13a) comprises:
        a first reservoir (13) with a first reservoir wall (25) and a first reservoir base (24),
            wherein at least the first reservoir (13) is provided with a partition wall (201) which projects from the first reservoir base (24) and divides the first reservoir (13) into at least two partial regions, wherein the outlet port (12) opens towards a first partial region (13b) and a second partial region (13c) being connected to the first partial region (13b) via a cut-through (202) in the partition wall (201), and
        a second reservoir (14) with a second reservoir wall (27) and a second reservoir base (26), wherein the conduit (2) adjoins the first reservoir wall (25) and the second reservoir wall (27) in such a way that, viewed in the oil conducting direction (F) of the conduit (2), the first reservoir base (24) is arranged between the inlet port (11) and the outlet port (12) and the second reservoir base (26) is located between the inlet port (11) and the first reservoir base (24).

2. The oil duct part (1) according to claim 1, wherein the oil duct part (1) is configured to be installed in the transmission (100) in a predetermined mounting state which defines an orientation of the oil duct part (1) relative to gravity (G), wherein, in an orientation corresponding to the predetermined mounting state, the first reservoir base (24) and the second reservoir base (26) are aligned approximately perpendicular to a force of gravity (G) and the oil conducting direction (F) from the inlet port (11) to the outlet port (12) has at least one component running counter to the force of gravity (G).

3. The oil duct part (1) according to claim 1, wherein an end of the conduit wall (21) facing away from the inlet port (11) of the conduit (2) forms a wall (21a) projecting over the first reservoir base (24) of the first reservoir (13) and delimiting the outlet port (12).

4. The oil duct part (1) according to claim 1, wherein the conduit (2) is continuously closed from the inlet port (11) to the outlet port (12) and is straight over at least 80% of its longitudinal extent.

5. The oil duct part (1) according to claim 1, wherein the second reservoir (14) can be filled by oil draining from the first reservoir (13) via a first dam (203).

6. The oil duct part according to claim 1, wherein the at least one drain (15a) includes at least one first drain (15) located in the first reservoir (13).

7. The oil duct part according to claim 6, wherein at least one second drain (16) is located in the second reservoir (14) and oil from the second reservoir (14) reaches the at least one second drain (16) via a dam (204).

8. The oil duct part according to claim 7, wherein the partition wall (201) is configured as a surge breaker, wherein the partition wall has a keel (206) facing the outlet port (12), from which partial walls bent backwards in opposite directions extend towards the at least one first drain (15) and a third drain (16a).

9. The oil duct part (1) according to claim 1, wherein the oil duct part (1) is configured as an insert part.

10. A transmission (100) having a transmission housing (140) and an oil duct part (1) according to claim 1, wherein the transmission housing (140) has at least one transmission gear (107) located at least partially in an oil sump (150) of the transmission (100) and the oil duct part (1) is arranged in a predetermined mounting state defining an orientation of the oil duct part (1) in the transmission housing (140) relative to gravity (G) wherein the predetermined mounting state has the inlet port (11) positioned at an end face of the transmission gear (107) located at least partially in the oil sump (150), the oil conducting direction (F) from the inlet port (11) to the outlet port (12) having at least one component running counter to a force of gravity (G), and at least the first reservoir base (24) located above the transmission gear (107).

11. The oil duct part (1) according to claim 1, wherein the oil duct part (1) is configured to be mounted in the transmission (100) of a motor vehicle.

12. The transmission (100) according to claim 10, wherein, during operation, oil thrown up from the oil sump (150) by the transmission gear (107) passes into the inlet port (11) and along the oil conducting direction (F) of the conduit (2) to the outlet port (12).

13. The transmission according to claim 10, wherein the at least one drain (15a) includes at least one first drain (15) located in the first reservoir (13) and having a drain port (17) which supplies a bearing of a first transmission element with oil and wherein the at least one drain (15a) further includes at least one second drain (16) located in the second reservoir (14) having a drain port (18) which supplies a bearing of a second transmission element with oil.

14. The transmission according to claim 13, wherein the bearing of the first transmission element is a bearing (175) of an input-side rotor shaft (102) mounted in the transmission (100), and the bearing of the second transmission element is a bearing (176) of a pinion (106).

15. The transmission (100) according to claim 10, wherein the transmission is a motor vehicle transmission.

* * * * *